United States Patent [19]

Hattori et al.

[11] 4,173,957
[45] Nov. 13, 1979

[54] ADDITIONAL AIR SUPPLY SYSTEM FOR AN INTERNAL COMBUSTION ENGINE

[75] Inventors: Tadashi Hattori, Okazaki; Akira Takata; Tamotsu Fukuda, both of Toyota; Takamichi Nakase, Gamagori, all of Japan

[73] Assignees: Nippon Soken, Inc., Nishio; Toyota Jidosha Kogyo Kabushiki Kaisha, Toyota, both of Japan

[21] Appl. No.: 802,311

[22] Filed: Jun. 1, 1977

[30] Foreign Application Priority Data

Jun. 14, 1976 [JP] Japan ................................ 51-70006
Jun. 14, 1976 [JP] Japan ................................ 51-70007
Jun. 22, 1976 [JP] Japan ................................ 51-73717

[51] Int. Cl.² ............................................. F02M 7/00
[52] U.S. Cl. ......................... 123/119 EC; 123/124 B; 123/32 EA
[58] Field of Search ........ 123/119 EC, 124 B, 32 EE, 123/32 EL, 32 EI, 32 EH, 32 EA, 119 D, 124 R; 60/285, 276

[56] References Cited

U.S. PATENT DOCUMENTS

| 3,673,989 | 7/1972 | Aono et al. | 123/32 EH |
|---|---|---|---|
| 3,895,611 | 7/1975 | Endo et al. | 123/32 EC |
| 3,960,130 | 6/1976 | De Person, Jr. | 123/124 B |
| 3,964,457 | 6/1976 | Coscia | 123/124 B |
| 4,020,813 | 5/1977 | Hattori et al. | 123/124 R |
| 4,036,186 | 7/1977 | Hattori et al. | 123/119 EC |
| 4,036,186 | 7/1977 | Hattori et al. | 123/124 R |
| 4,057,042 | 11/1977 | Aono | 123/119 EC |

Primary Examiner—Charles J. Myhre
Assistant Examiner—R. A. Nelli
Attorney, Agent, or Firm—Cushman, Darby & Cushman

[57] ABSTRACT

An additional air supply system for adjusting the air-fuel ratio of a mixture includes the improved control unit for actuating, at two different speeds, a drive motor of a bypass valve disposed in an additional air supply path. The control unit is provided with an air-fuel ratio discriminating circuit for generating high and low level signals by comparing a detected air-fuel ratio with the stoichiometric ratio, and an actuating circuit for producing pulse signals at each instant of inversion of the signal levels of the air-fuel ratio discriminating circuit in such that for a predetermined period from the instant of inversion a high frequency pulse signal is produced and then a low frequency pulse signal is produced for the remaining period until the next inversion. Since the pusle signals having two different frequencies are applied to the drive motor of the bypass valve, the bypass valve is driven at a fast speed to a predetermined amount of opening or closing and then moved slowly until the next inversion of the signal level.

13 Claims, 14 Drawing Figures

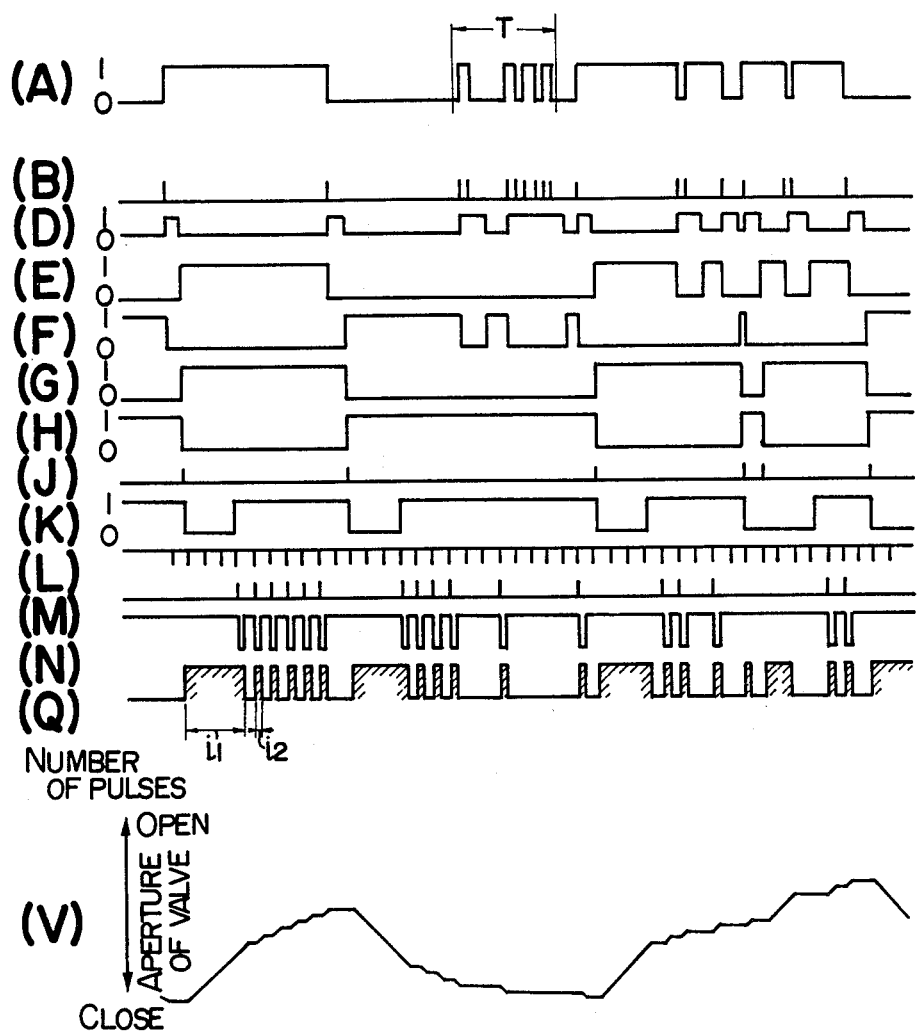

ADDITIONAL AIR SUPPLY SYSTEM FOR AN INTERNAL COMBUSTION ENGINE

The present invention relates to an air flow rate control apparatus for an internal combustion engine.

When it is desired to attain a maximum effect of anti-pollution of exhaust gas in an internal combustion engine of a motor vehicle or the like designed to reduce the pollution problem or when it is desired to clean the exhaust gas to a maximum extent by catalyst in an internal combustion engine having an exhaust gas cleaning catalyst, it is necessary to properly control an air-fuel ratio of air-fuel mixture supplied to the engine or to properly control a flow rate of secondary air to the catalyst.

An apparatus for this purpose has been proposed wherein a gas sensor for detecting an air-fuel ratio of air-fuel mixture by a concentration of oxygen which is a component of the exhaust gas and a bypass valve which is responsive to a signal from the gas sensor to be continuously driven at a constant speed are employed to control the flow rate of air additionally supplied from a correcting air path for adjusting the air-fuel ratio of the air-fuel mixture.

However, since the proposed apparatus uses an integration control system wherein an aperture of the bypass valve is gradually increased or decreased, a delay of response is included when a rate of change of the air-fuel ratio is high such as during acceleration or deceleration of the engine, even when a drive speed of the bypass valve has been set to an optimum value, because the drive speed is fixed. On the other hand, in a low load and low rotation speed range of the engine, a delay of response of the system included from the change of the air-fuel ratio in an intake system to the detection of that change by the gas sensor in an exhaust system is so long that an overrun of the control occurs resulting in a large variation of the air-fuel ratio.

Furthermore, in the proposed apparatus, because of disturbance in exhaust gas flow at a location at which the gas sensor is mounted, the gas sensor may sense a local oxygen concentration rather than an overall oxygen concentration. As a result, the air-fuel ratio of the air-fuel mixture which is related to the oxygen concentration may be sensed incorrectly. For example, in spite of the fact that the air-fuel ratio of the entire air-fuel mixture is high (i.e. the air-fuel mixture is lean), a pulse or spike signal which indicates that the air-fuel ratio is low (i.e. the air-fuel mixture is rich) may be generated, which signal erroneously actuate the bypass valve to change the air-fuel ratio.

It is an object of the present invention to overcome the drawbacks encountered in the prior art apparatus.

In the present invention, a bypass valve for controlling a flow rate of supplementary air is driven at a first high speed by a predetermined amount after the reversal of a signal detected by a gas sensor which is mounted in an exhaust pipe to detect a predetermined component of exhaust gas, and thereafter the bypass valve is driven at a second speed until the next occurrence of the reversal of the signal of the gas sensor, so that a delay of response of supply of the supplementary air to an intake system or an exhaust system of an engine as well as an overshoot of the bypass valve are prevented and a desired air-fuel ratio can be rapidly attained. Accordingly, the variation in the air-fuel ratio can be minimized.

The above object can be more effectively achieved when the first speed is higher than the second speed.

In accordance with one aspect of the present invention, the predetermined amount of the aperture of the bypass valve driven at the first speed is controlled in accordance with a rotation speed of the engine and/or acceleration/deceleration status of the engine to attain the desired air-fuel ratio more rapidly.

In accordance with another aspect of the present invention, the bypass valve is intermittently driven during the drive at the second speed to attain the desired air-fuel ratio rapidly and to positively prevent the overshoot of the bypass valve.

In accordance with another aspect of the present invention, the second speed is coordinated with the rotation speed of the engine during the drive of the bypass valve at the second speed to improve the response.

In accordance with a further aspect of the present invention, the drive of the bypass valve is stopped for a given time period when the signal of the gas sensor is reversed so that erroneous operation of the bypass valve is prevented and the response is improved.

The above and other objects and features of the present invention will be more fully understood from the following description of the preferred embodiments of the invention when taken in conjunction with the accompanying drawings. It is to be expresely understood, however, that the drawings are for the purpose of illustration only and are not intended as the description of the limits of the present invention. In the drawings:

FIG. 14 shows waveforms for explaining the operation of the control unit of FIG. 13.

Figure 1:
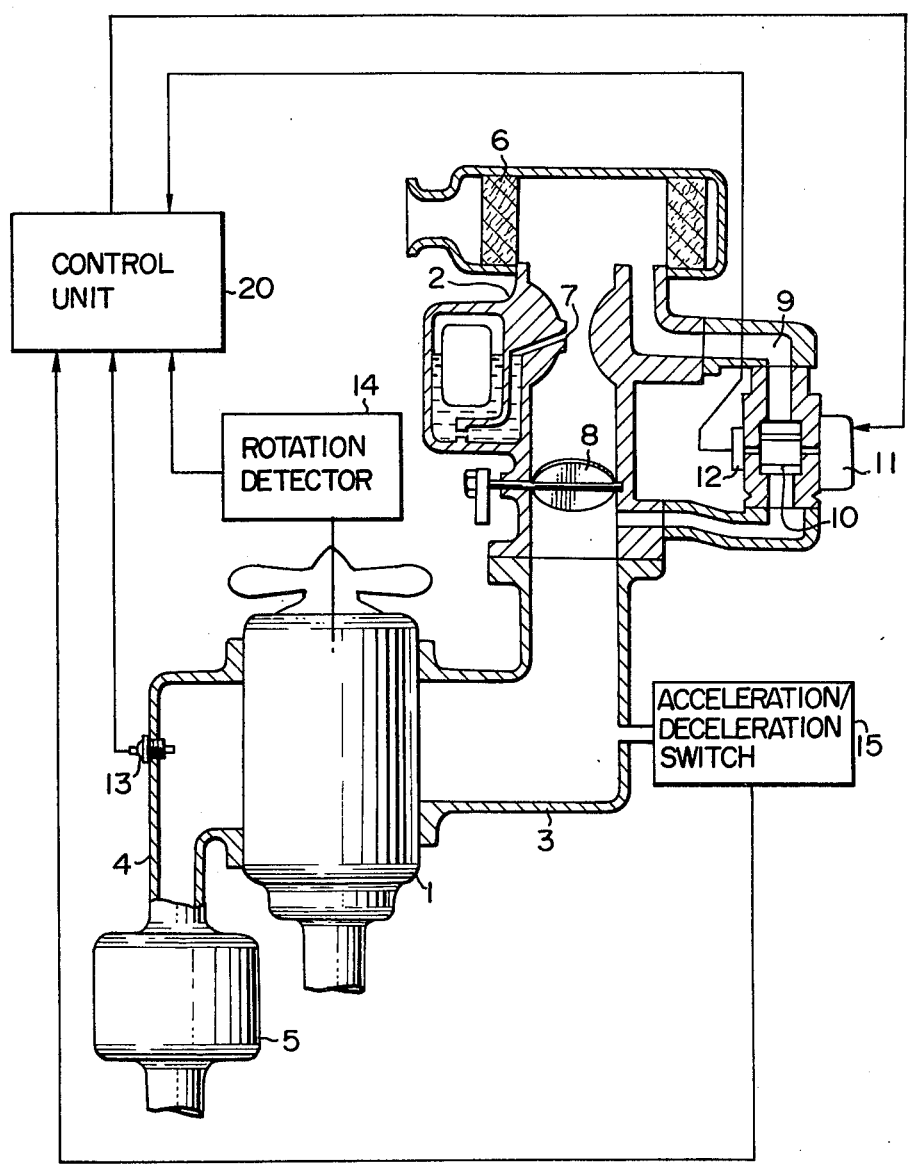
FIG. 1 shows a configuration of an air flow rate control apparatus for an internal combustion engine in accordance with the present invention.

The present invention will now be explained in conjunction with the preferred embodiments shown in the drawings.

Referring to FIG. 1 which shows a system configuration, an engine 1 is a conventional reciprocating engine supplied with gasoline or LP gas as fuel, and air-fuel mixture is supplied thereto by a carburetor 2 through a suction manifold 3. After the combustion of the air-fuel mixture, the engine 1 exhausts exhaust gas to an exhaust manifold 4 and the exhaust gas is ejected to atmosphere past a catalyst converter 5 mounted downstream of the exhaust manifold 4 and through a muffler, not shown.

The catalyst converter 5 functions to clean noxious components in the exhaust gas and may include a three-way catalyst which simultaneously cleans NOx, CO and HC.

The carburetor 2 may be of a conventional type which mixes air from an air cleaner 6 with fuel and atomizes the air-fuel mixture. It ejects an amount of fuel which is proportional to the amount of intake air from a fuel nozzle 7 which opens to a venturi section and controls the amount of intake air by an adjustable throttle valve 8 which is mounted downstream of the fuel nozzle 7. A supplementary air path 9 is provided which bypasses the fuel nozzle 7 and the throttle valve 8 to communicate the air cleaner 6 with the downstream of the throttle valve 8 for supplying additional air. Mounted to the supplementary air path 9 are a butterfly type bypass valve 10 and a four-phase pulse motor 11 coupled to the bypass valve 10 for opening and closing the same.

A full-close position sensor 12 coupled to the bypass valve 10 detects the full-close position of the bypass valve 10 to close a contact of the sensor 12 to pass an electrical signal of the sensor 12 to a control unit 20.

Figure 2:
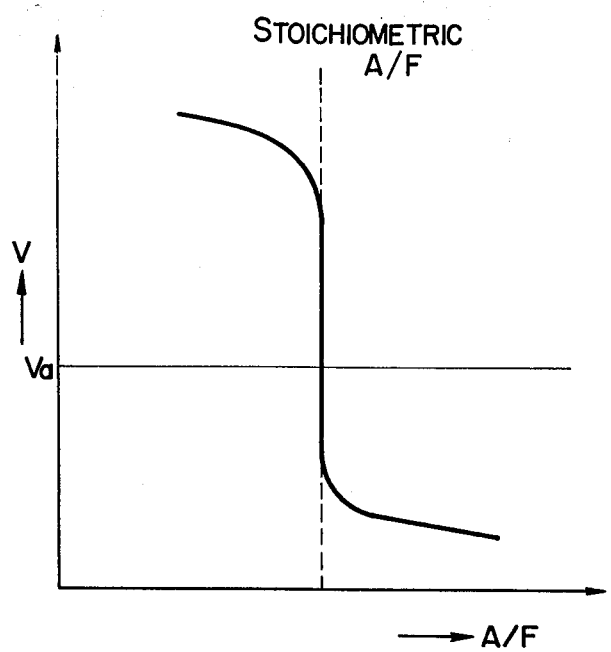
FIG. 2 shows an output characteristic of a gas sensor.

A gas sensor 13 is mounted in the exhaust system of the engine 1, for example at junction of the exhaust manifold 4 and detects an exhaust gas component to determine the air-fuel ratio of the air-fuel mixture correlated thereto. The sensor element consists of a metal oxide such as zirconium dioxide or titanium dioxide. When it consists of zirconium dioxide, it produces an e.m.f. of approximately one volt when air-fuel mixture richer than that of stoichiometric air-fuel ratio is supplied to the engine 1 while it produces an e.m.f. of approximately 100 milli-volts when air-fuel mixture leaner than that of the stoichiometric air-fuel ratio is supplied, and the e.m.f. changes stepwise near the stoichiometric air-fuel ratio as shown in FIG. 2.

A rotation detector 14 produces signals which are in synchronism with the rotation of a crank shaft of the engine 1, that is, in accordance with a rotation speed of the engine 1. In the illustrated embodiment, an on-off signal at a negative terminal of a primary winding of an ignition coil which is usually used as an ignition apparatus for the engine 1 is utilized, and an output signal of the rotation detector 14 is applied to the control unit 20.

An acceleration 1 deceleration switch 15 is mounted in the suction manifold 3 to turn on and off a switch in response to the change in suction negative pressure. It is turned on when the suction negative pressure abruptly changes such as during the acceleration or deceleration of the engine 1 and an output signal thereof is applied to the control unit 20.

Figure 3:
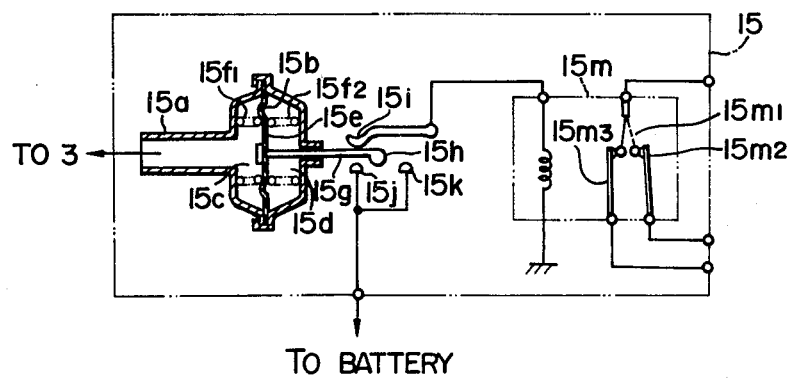
FIG. 3 is a sectional view of major portions of one embodiment of an acceleration/deceleration switch used in the present invention.

The acceleration/deceleration switch 15 is of a diaphragm structure as shown in FIG. 3. In FIG. 3, two chambers 15c and 15d are defined by a casing 15a and a diaphragm 15b with each chamber communicating with the other through a throttle jet 15e of the diaphragm 15b. The chambers 15c and 15d are provided with back-springs 15$f_1$ and 15$f_2$, respectively, for urging the diaphragm 15b and the chamber 15c communicates with the suction manifold 3. A conductive shaft 15g is fixed to the diaphragm 15b and a contact 15h is formed at an end of the shaft 15g. A slidable terminal 15i is mounted to the shaft 15g such that it constantly contacts with the shaft 15g while terminals 15j and 15k are mounted such that they contact with the shaft 15g at predetermined positions of the shaft 15g. A relay 15m is actuated or deactuated by the conduction or non-conduction of the terminal 15g and the terminals 15j and 15k such that when the terminals are electrically connected a contact 15$m_1$ and a contact 15$m_2$ are electrically connected and when the terminals are separated the contact 15$m_1$ and a contact 15$m_3$ are electrically connected. In this manner, the relay 15m is switched depending on the acceleration state or the deceleration state of the engine 1.

The rotation detector 14 and the acceleration/deceleration switch 15 constitute a sensor for sensing the operation condition of the engine 1, that is, a delay time from the change in exhaust gas component caused by the addition of air to the detection of that change by the gas sensor 13.

Figure 4:
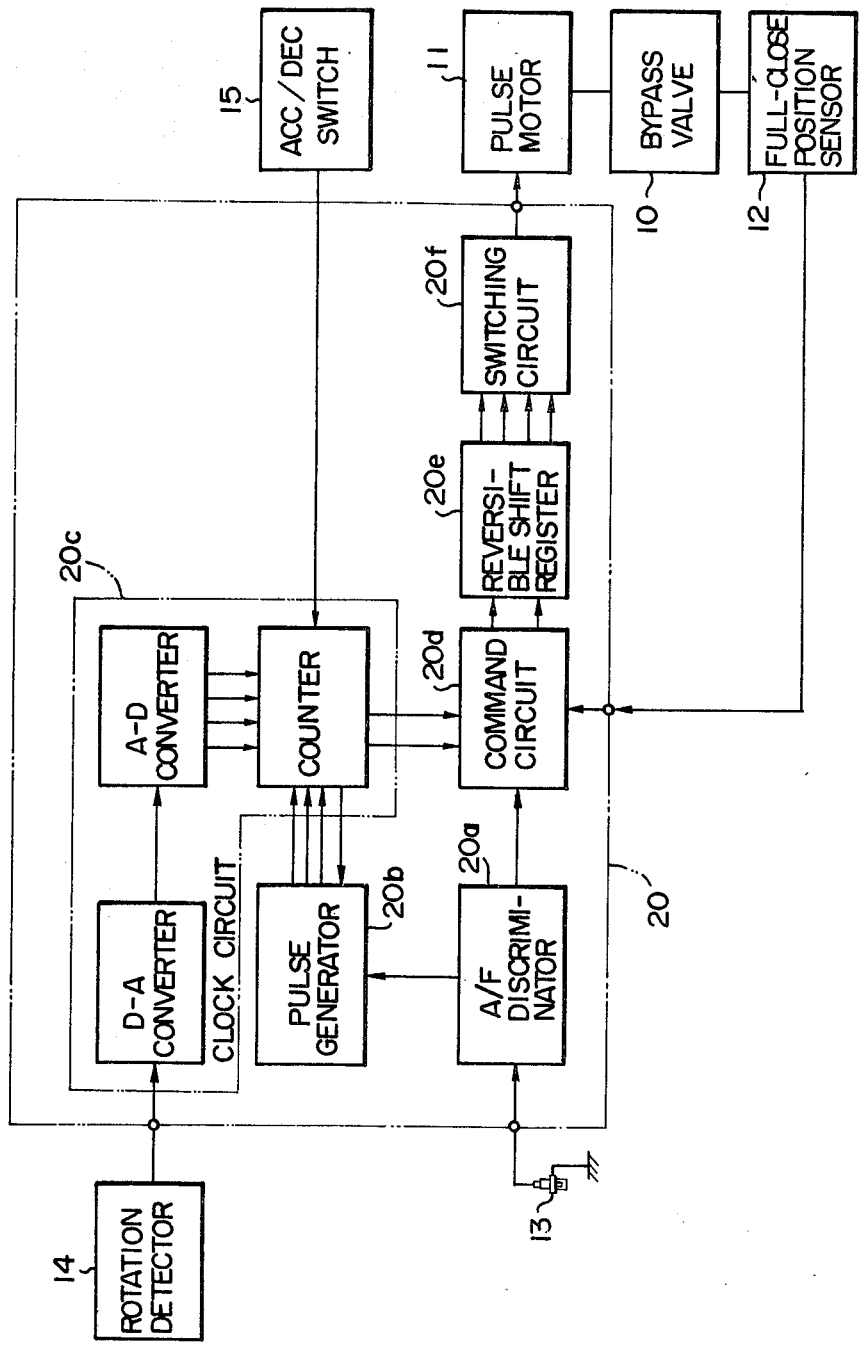
FIG. 4 is a block diagram illustrating one embodiment of a control unit of the present invention.

Referring to FIG. 4 which shows a block diagram of the control unit 20, the control unit 20 receives as input signals thereto an air-fuel ratio signal from the gas sensor 13, which signal is representative of the exhaust gas component which is closely related to the air-fuel ratio of the air-fuel mixture, an output signal from the rotation detector 14 and the acceleration/deceleration switch 15, and an output signal from the full-close position sensor 12, and the control unit 20 comprises an air-fuel ratio discriminating circuit 20a for discriminating the air-fuel ratio signal, a pulse generator circuit 20b for generating two different clock pulse trains in synchronism with the air-fuel ratio signal, a clock circuit 20c for counting the clock pulses in accordance with a delay time to set drive amount of the bypass valve 10, a command circuit 20d for logically controlling output signals of the air-fuel ratio discriminating circuit 20a and the clock circuit 20c, a reversible shift register 20e which sequentially shifts an output signal in response to a signal from the command circuit 20d, and a switching circuit 20f for controlling the excitation of the four-phase pulse motor 11 in response to the output signal of the reversible shift register 20e to properly drive the pulse motor 11.

Figure 5:
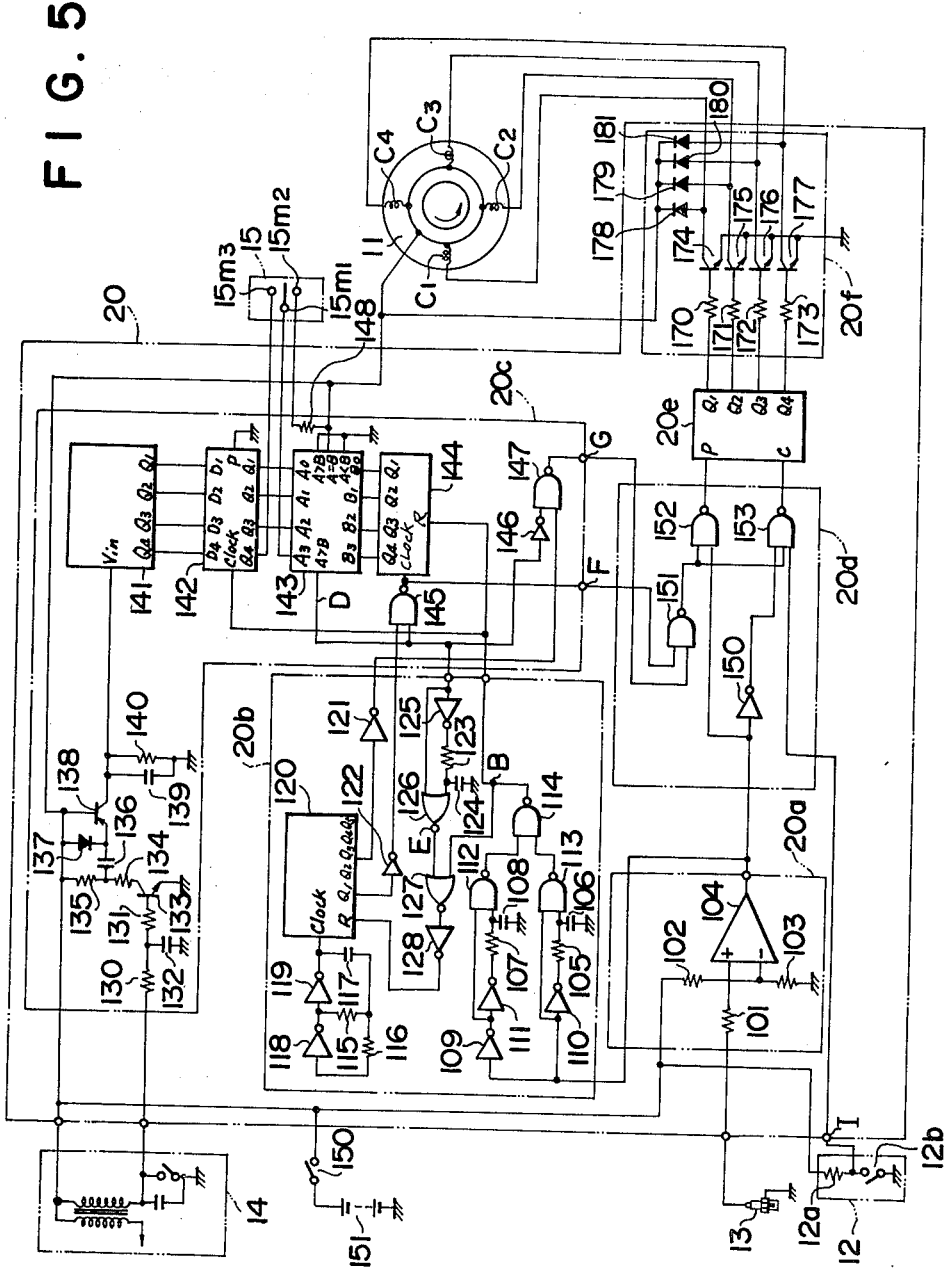
FIG. 5 is an electrical circuit diagram illustrating detail of the block diagram of FIG. 4.

Referring to FIG. 5, the control unit 20 is explained in more detail. In FIG. 5, the air-fuel ratio discriminating circuit 20a is a voltage comparator circuit comprising an input resistor 101, dividing resistors 102, 103, and a differential operational amplifier 104. A reference level determined by the dividing resistors 102 and 103 is set to a voltage $V_a$ (FIG. 2) of the gas sensor 13 at the stoichiometric air-fuel ratio. Accordingly, when the air-fuel ratio detected by the gas sensor 13 is lower than the stoichiometric air-fuel ratio, that is, when the air-fuel mixture is rich, the operational amplifier 104 produces a "1" level signal, and when the air-fuel ratio detected is higher than the stoichiometric air-fuel ratio, that is, when the air-fuel mixture is lean, the operational amplifier 104 produces a "0" level signal.

The pulse generator circuit 20b comprises two monostable multivibrators having resistors 105, 107, capacitors 106, 108, inverters 110, 111 and NAND gates 112, 113, respectively, a first trigger circuit having an inverter 109 and a NAND gate 114, an astable multivibrator having resistors 115 and 116, a capacitor 117 and inverters 118 and 119, an oscillation circuit having a binary counter 120 and inverters 121 and 122, a second trigger circuit having a resistor 123, a capacitor 124, an inverter 125 and a NOR gate 126, and a gate circuit having a NOR gate 127 and an inverter 128.

The first trigger circuit produces a trigger pulse at a terminal B as shown in FIG. 6(B) in synchronism with the reversal, that is, rise and fall of the output signal of the operational amplifier 104 of the air-fuel ratio discriminating circuit 20a (See FIG. 6(A)).

The second trigger circuit produces a trigger signal as shown in FIG. 6(E) in synchronism with the fall of the output of the clock circuit 20c (See FIG. 6(D)). The trigger pulses of the first and second trigger circuits are applied to a reset terminal of the binary counter 120 through the gate circuit (127, 128) to reset the binary counter 120.

The oscillator circuit (120, 121, 122) produces clock pulses of a given frequency by the astable multivibrator, which frequency is divided by the binary counter 120 to produce ½ frequency divided pulses at an output $Q_1$ and ⅛ frequency divided pulses at an output $Q_3$.

The clock circuit 20c comprises a digital-analog conversion circuit having resistors 130, 131, 134, 135, 140, capacitors 132, 136, 139, transistors 133, 138, and a diode 137, an analog-digital conversion circuit 141 for converting an analog voltage to a binary digital signal, and a counter circuit having a D-type latch circuit 142 for temporarily holding the digital signal of the analog-digital conversion circuit 141, a comparator 143 for comparing the digital signals, a binary counter 144 for counting the clock pulses, NAND gates 145 and 147, an inverter 146, and a resistor 148.

The digital-analog conversion circuit receives the on-off signal of the primary winding of the ignition coil of the ignition apparatus 14 as an input signal and converts it to an analog signal, the amplitude of which increases in proportion to the increase of the rotation speed of the engine. The output voltage is then applied to the analog-digital converter 141, which converts the applied input voltage to a binary digital signal at the outputs $Q_1$ to $Q_4$.

The terminals $D_1$ to $D_4$ of the D-type latch circuit 142 are connected to the terminals $Q_1$ to $Q_4$ of the analog-digital converter 141, and a clock terminal thereof is connected to an output terminal B of the first trigger circuit (114) of the pulse generator circuit 20c. The D-type latch circuit 142 reads in the output of the analog-digital converter 141 at the rise of the trigger pulse of the first trigger circuit and holds the read-in data until the next trigger pulse is applied, when it produces an output at the output terminals $Q_1$ to $Q_4$. The output terminals $Q_1$ to $Q_3$ of the D-type latch circuit 142 are connected to input terminals $A_0$ to $A_2$ of the comparator 143, respectively while the output terminal $Q_4$ is connected to an input terminal $A_3$ through the acceleration/deceleration switch 15. During normal operation of the engine 1, the contacts $15m_1$ and $15m_3$ of the acceleration/deceleration switch 15 are connected together so that the terminal $Q_4$ and the terminal $A_3$ are connected together. During the transient such as acceleration or deceleration of the engine 1, the contact $15m_1$ and the contact $15m_2$ are connected together so that a "1" level signal is applied to the terminal $A_3$ through the resistor 148.

The input terminals $B_0$ to $B_3$ of the comparator 143 are connected to the output terminals $Q_1$ to $Q_4$ of the binary counter 144, respectively, and the output terminal (A>B) of the comparator 143 is connected to the NAND gate 145 and the inverter 146. The output terminal (A>B) of the comparator 143 produces a "1" level signal when a specified number A applied to the terminal A is larger than the count B applied to the terminal B (i.e. A>B), and the output changes from "1" level to "0" level when the relation of A≦B is met, as shown in FIG. 6(D).

When the number of the clock pulses applied to the binary counter 144 from the NAND gate 145 reaches the specified number established by the D-type latch circuit 142, the NAND gate 145 is closed by the output at the terminal (A>B) so that the binary counter 144 stops to count, and the NAND gate 147 is opened. The above operation is repeated each time the trigger pulse is applied to the reset terminal R of the binary counter 144.

In this manner, the clock circuit 20c produces at the output terminal F a predetermined number of pulses of a shorter period as shown in FIG. 6(F) is synchronism with the change of the detection signal of the gas sensor 13, that is, with the air-fuel ratio signal shown in FIG. 6(A), and thereafter produces clock pulses of a longer period until the air-fuel ratio signal again changes as shown in FIG. 6(G).

The full-close position sensor 12 comprises a resistor 12a and a contact 12b. When the bypass valve 10 is fully closed, the contact 12b is closed producing a "0" level signal at output terminal I thereof.

The command circuit 20d comprises an inverter 150 and NAND gates 151, 152 and 153, and it gates the clock pulses of the clock circuit 20c in response to the air-fuel ratio signal of the air-fuel ratio discriminating circuit 20a and the full-close signal of the full-close position sensor 12.

The reversible shift register 20e is of a known type and it sequentially shifts the content in the sequence of the output terminals $Q_1$, $Q_2$, $Q_3$, $Q_4$ when the clock pulse is applied to the input terminal P, and sequentially shifts the content in the sequence of the output terminals $Q_4$, $Q_3$, $Q_2$, $Q_1$ when the clock pulse is applied to the input terminal C. The output terminals thereof are connected to the switching circuit 20f comprising resistors 170, 171, 172, 173, transistors 174, 175, 176, 177, and back e.m.f. absorbing diodes 178, 179, 180, 181, and the switching circuit 20f is connected to field coils $C_1$, $C_2$, $C_3$ and $C_4$ of the pulse motor 11.

When the clock pulse is applied to the input terminal P of the reversible shift register 20e, the transistors 174 through 177 conduct sequentially so that the field coils $C_1$, $C_2$, $C_3$ and $C_4$ of the pulse motor 11 are excited two at a time to rotate a rotor of the pulse motor 11 in the direction of an arrow shown in FIG. 5, that is, in the direction to open the bypass valve 10. On the other hand, when the clock pulse is applied to the input terminal C, the pulse motor 11 rotates in the direction opposite to the arrow shown in FIG. 5, that is, in the direction to close the bypass valve 10.

The control unit 20 and the pulse motor 11 are powered by a battery 151 through a switch 150 linked to a key switch of the engine 1.

In the arrangement described above, the carburetor 2 performs conventional control of the amount of fuel and it is similar to a known carburetor except that it is conditioned to an air-fuel ratio which is slightly lower (richer) than a desired air-fuel ratio and major air is fed to the carburetor where it is mixed with fuel and the resulting air-fuel mixture is supplied to the engine 1. After the combustion in the engine 1, the exhaust gas is exhausted to the atmosphere through the exhaust manifold 4 and the catalyst converter 5. The gas sensor 13 mounted in the exhaust path of the exhaust manifold 4 senses the air-fuel ratio. The output signal of the gas sensor 13 is applied to the control unit 20, which determines whether the air-fuel mixture is lower (richer) or higher (leaner) than the desired air-fuel ratio. When the air-fuel mixture is richer, the pulse motor 11 drives the bypass valve 10 mounted in the supplementary air path 9 in the opening direction, and when the air-fuel mixture is leaner the pulse motor 11 drives the bypass valve 10 in the closing direction so that the desired air-fuel ratio is attained by the control of the supplementary air. In order to prevent the "overrun" of the bypass valve 10 in which the air-fuel mixture does not reach the desired air-fuel ratio even when the bypass valve 10 has reached the full-close position and the air-fuel ratio discriminating circuit 20a causes the bypass valve 10 to be further driven, the NAND gate 153 is closed when the full-close position sensor 12 detects the full-close position of the bypass valve 10 so that the supply of the clock pulses to the reversible shift register 20e is stopped to prevent further drive of the pulse motor 11 in the closing direction of the bypass valve 10.

Figure 6:
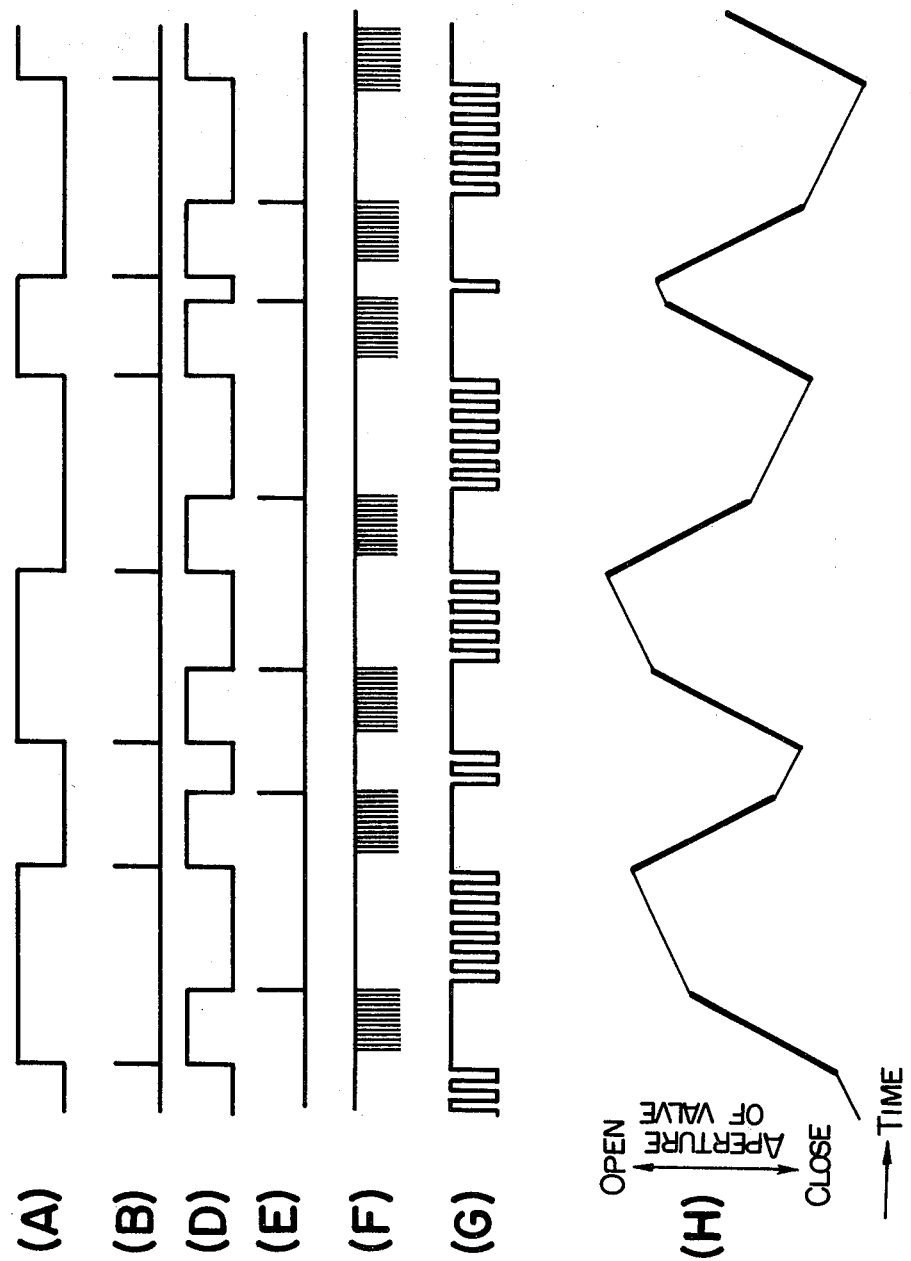
FIG. 6 shows waveforms for explaining the operation of the control unit of FIGS. 4 and 5.

The control for the pulse motor 11 and the bypass valve 10 is now explained with reference to FIG. 6. The air-fuel mixture generated in the carburetor 2 changes by various factors and the e.m.f. V of the gas sensor 13 changes therewith as shown in FIG. 2. Accordingly, the air-fuel ratio discriminating circuit 20a produces the "1" or "0" level signal as shown in FIG. 6(A) depending on the level of the e.m.f. V. In response to the change of the output signal of the air-fuel ratio discriminating circuit 20a, the first trigger circuit (114) produces the trigger pulses as shown in FIG. 6(B), and the binary counters 120 and 144 are reset thereby and the D-type latch circuit 142 reads in the output of the analog-digital converter 141 representative of the rotation speed of the engine.

The binary counter 144 of the clock circuit 20c starts to count the clock pulses from the output $Q_1$ of the binary counter 120 through the NAND gate 145 and transmits the high frequency clock pulses shown in FIG. 6(F) to the command circuit 20d until the specified count corresponding to the delay time established by the D-type latch circuit 142 is reached, thereafter the clock circuit 20c transmits the low frequency clock pulses from the output $Q_3$ of the binary counter 120 through the NAND gate 147 as shown in FIG. 6(G) to the command circuit 20d.

The clock pulses are gated by the command circuit 20d in response to the output signal of the air-fuel ratio discriminating circuit 20a so that the pulse motor 11 is driven by the clock pulses through the reversible shift register 20e and the switching circuit 20f.

The clock pulses are of relatively high frequency as seen from FIG. 6(F) and of the number equal to the number established by the D-type latch circuit 142. As a result, the bypass valve 11 is driven rapidly by the specified amount (specified aperture). Thus, the aperture of the bypass valve 11 changes relatively rapidly as shown by thick solid lines in FIG. 6(H).

The number of pulses corresponds to the rotation speed of the engine at the transition of the air-fuel ratio signal. During the acceleration or deceleration of the engine 1, the terminal $A_3$ of the comparator 143 is forced to "1" level by the acceleration/deceleration switch 15 so that the value 8 is added to increase the specified number. As a result, the resulting number corresponds to the delay time.

When the specified number of clock pulses have been counted, the comparator 143 closes the NAND gate 145 and opens the NAND gate 147 to reset the binary counter 120 through the second trigger circuit to produce the low frequency clock pulses shown in FIG. 6(G), which are now applied to drive the pulse motor 11. In this manner, the aperture of the bypass valve 10 changes is shown by the thin solid lines of FIG. 6(H). The drive of the bypass valve 10 by the clock pulses continues until the outut signal of the air-fuel ratio discriminating circuit 20a changes, namely until a time when the NAND gate 147 is closed and the NAND gate 145 is opened so that the high frequency clock pulses are again applied from the terminal F to the command circuit 20d.

In this manner, the pulse motor 11 is driven fast, by the specified amount corresponding to the delay time of the system in synchronism with the change of the output signal of the gas sensor 13, and thereafter the pulse motor 11 is driven at a relatively slow speed. Thus, the overrun of the control of the bypass valve 10, that is, the overshoot during the normal (steady) operation of the engine 1 is prevented and the variation of the air-fuel ratio of the air-fuel mixture is minimized. For example, in the low rotation speed range of the engine 1, the time period during which the bypass valve 10 is driven fast by the high frequency clock pulses is short so that the drive speed of the bypass valve 10 is reduced as a whole to correspond to the delay time of the system. Thus, the overshoot of the control is prevented and the excessive supply of the supplementary air, which would otherwise be caused by the overshoot, is prevented, the variation of the air-fuel ratio is reduced and the surging of the engine 1 is prevented.

During the transient of the engine 1 such as during the acceleration or deceleration, the time period during which the bypass valve 10 is driven fast by the high frequency clock pulses is extended by the acceleration/deceleration switch 15 and the drive speed of the bypass valve 10 is increased as a whole so that the correction of the air-fuel ratio can be effected to fully follow the fast change of air-fuel ratio.

In this manner, the variation of the air-fuel ratio of the air-fuel mixture is minimized and the catalyst converter 5 can clean the exhaust gas with a high efficiency. Furthermore, the drivability of the car is also enhanced.

Thus, as described hereinabove, in the first embodiment of the present invention, each time the output of the air-fuel ratio discriminating circuit changes from "1" to "0" or from "0" to "1", pulse generator 20b, clock circuit 20c, command circuit 20d, shift register 20e and switching circuit 20f cooperate with pulse motor 11 to drive the bypass valve 10 at a first drive speed for a given time period and thereafter drive the bypass valve 10 at a second drive speed until the output of the air-fuel ratio discriminating circuit next changes. The first drive speed is faster than the second drive speed and the given time period is determined by the engine rotation speed and the acceleration/deceleration status of the engine.

A second embodiment of the present invention in which the second drive speed is determined by the rotation speed of the engine and the acceleration/deceleration status of the engine is now explained. The second embodiment is similar to the overall configuration shown in FIG. 1 except the control unit 20 and the same reference numerals are used to represent the like parts.

The difference from the first embodiment is particularly explained below.

Figure 7:
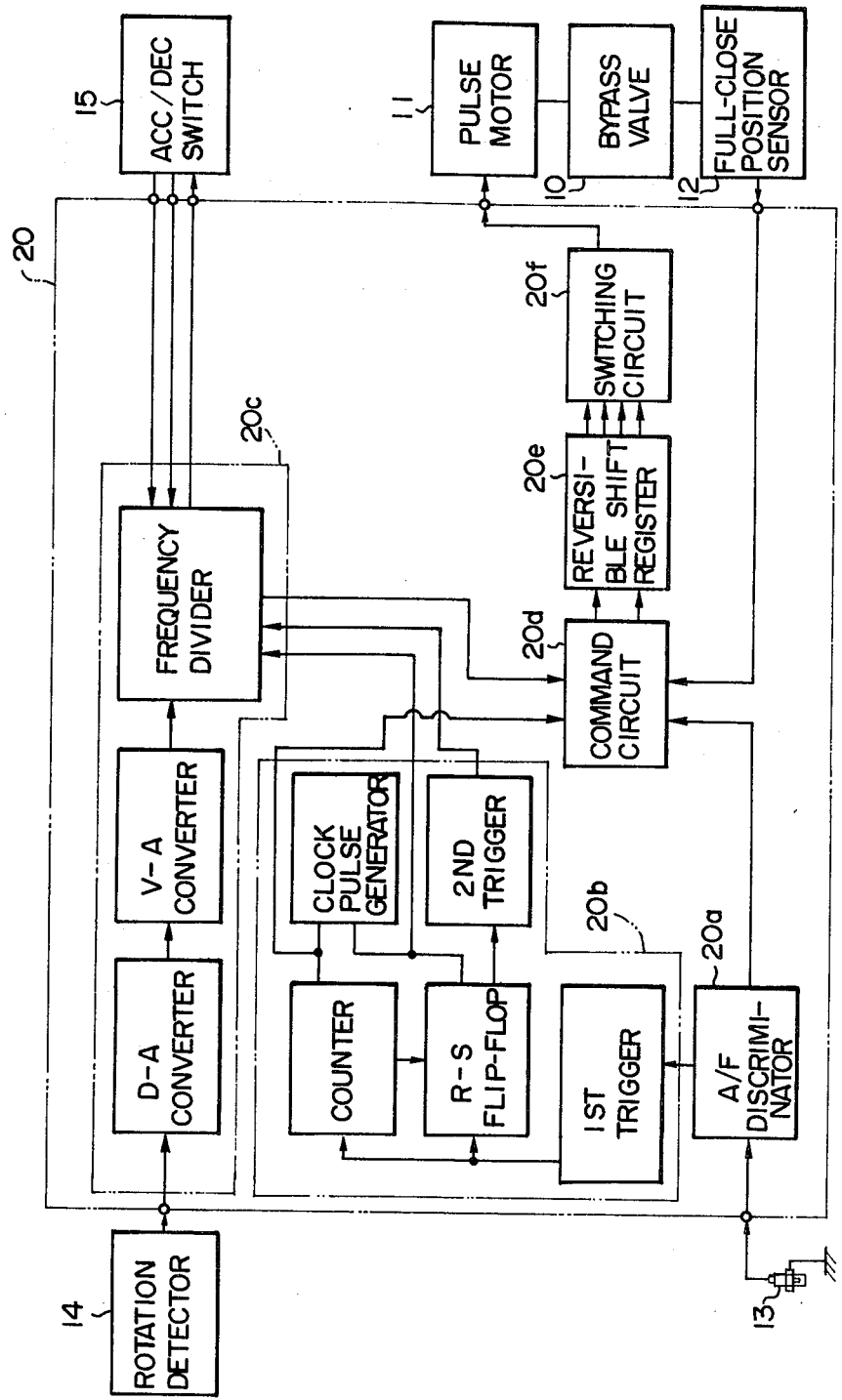
FIG. 7 is a block diagram illustrating a second embodiment of the control unit of the present invention.

Referring to FIG. 7 which shows a block diagram of the control unit 20, it receives as input signals thereto the air-fuel ratio signal from the gas sensor 13, which signal is closely related to the air-fuel ratio of the air-fuel mixture, the output signal from the rotation detector 14 and the acceleration/deceleration switch 15 and the output signal of the full-close position sensor 12, and it comprises the air-fuel ratio descriminating circuit 20a for discriminating the air-fuel ratio signal, the first clock circuit 20b for generating clock pulses of the given frequency and producing them in synchronism with the reversal of the output of the air-fuel ratio discriminating circuit 20a, the second clock circuit 20c for generating clock pulses in response to the outputs of the delay time sensor 14 and 15 and the first clock circuit 20b, the command circuit 20d for logically controlling the clock pulses of the first and second clock circuits 20b and 20c in response to the output signal of the air-fuel ratio discriminating circuit 20a, the reversible shift register 20e which sequentially shifts the output signals in response to the signal from the command circuit 20d, and the switching circuit 20f for controlling the excitation of the pulse motor 11 by the output signal of the reversible shift register 20e to properly drive the pulse motor 11.

Figure 8:
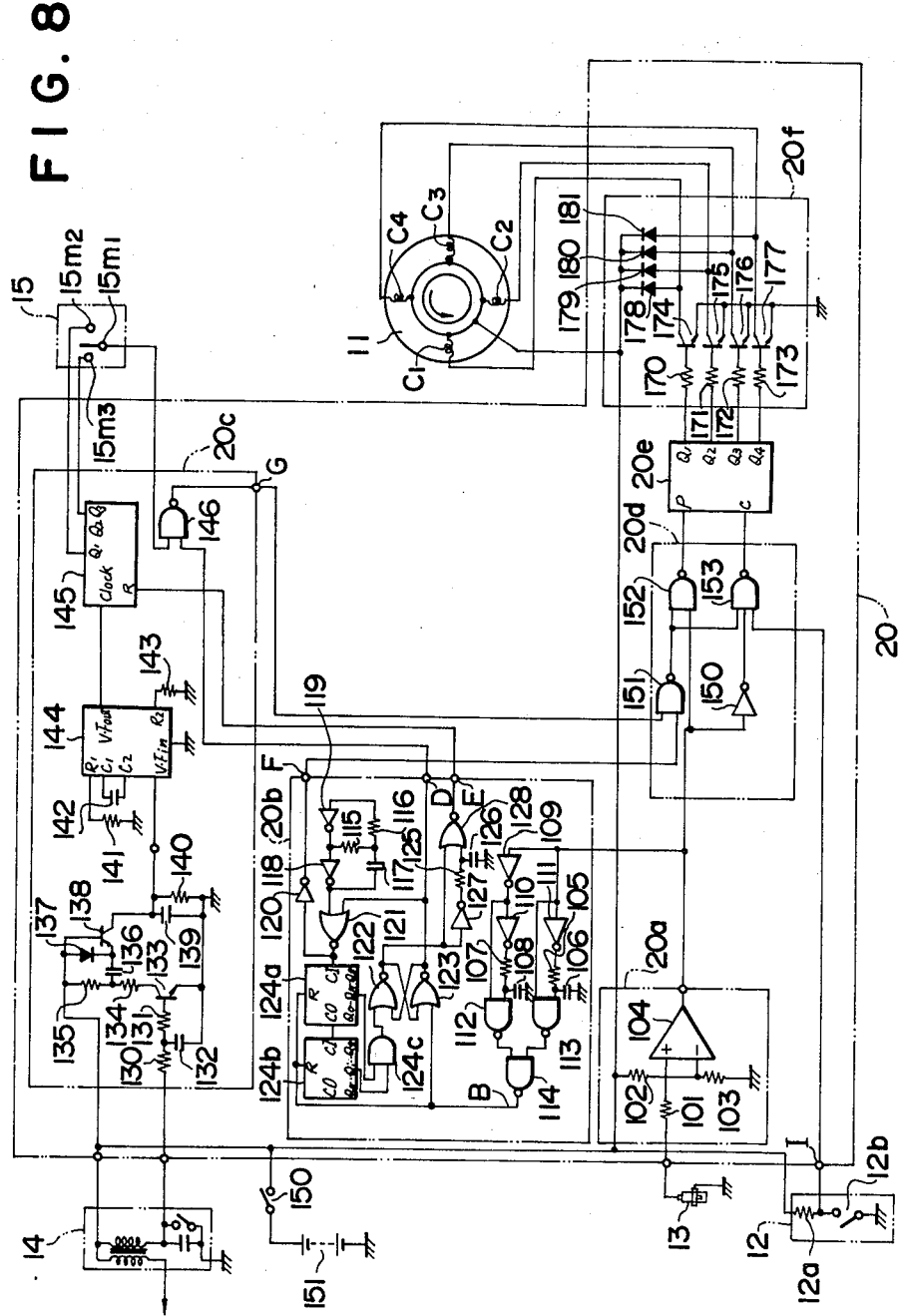
FIG. 8 is an electrical circuit diagram illustrating detail of the block diagram of FIG. 7.

Referring to FIG. 8, the detail of the control unit 20 is explained. In FIG. 8, the air-fuel ratio discriminating circuit 20a is of the same construction as in the first embodiment and the operational amplifier 104 produces a "1" level signal when the air-fuel ratio sensed by the gas sensor 13 is lower than the desired air-fuel ratio, that is, when the air-fuel mixture is richer, and produces a "0" level signal when the sensed air-fuel ratio is higher than the desired air-fuel ratio, that is, when the air-fuel mixture is thinner.

The first clock circuit 20b comprises the two monostable multivibrators having the resistors 105, 107, the capacitors 106, 108, the inverters 110, 111 and the NAND gates 112, 113, respectively, the first trigger circuit having the inverters 109 and the NAND gate 114, the pulse generator circuit including the astable multivibrator having the resistors 115 and 116, the capacitors 117 and the inverters 118 and 119, an R-S flip-flop having NOR gates 122 and 123, a counter circuit having decode counters 124a and 124b and an AND gate 124c, and the second trigger circuit having the resistor 125, the capacitor 126, the inverter 127 and the NOR gate 128.

The first trigger circuit (114) produces a trigger pulse at the terminal B as shown in FIG. 9(B) in synchronism with the transition of the output signal of the operational amplifier 104 of the air-fuel ratio discriminating circuit 20a (See FIG. 9(A)), that is, with the rise and full thereof.

The pulse generator circuit (115-119) produces the clock pulses of a given frequency by the astable multivibrator and applies those pulses to an carry-in terminal CI of the decode counter 124a through the NOR gate 121. Each of the decode counters 124a and 124b is conventional decimal counter and counts up at the rise of the clock pulse applied to the carry-in terminals CI thereof and produces an output signal at $Q_0, Q_1, \ldots Q_9$ sequentially and all of the outputs thereof are reset to "0" level by the trigger pulse of the first trigger circuit (114) applied to the reset terminal R thereof.

In the illustrated embodiment, the decode counter (124a or 124b) completes a cycle each time it has received ten input pulses and produces a "1" level signal at a carry-out terminal CO. The terminal CO of the decode counter 124a is connected to the terminal CI of the decode counter 124b so that the counter circuit counts the number between 0 and 99.

The R-S flip-flop comprising the NOR gates 122 and 123 is triggered by the trigger pulse of the first trigger circuit (114) so that the output of the NOR gate 123 assumes "0" level as shown in FIG. 9(D), which "0" level signal opens the NOR gate 121 such that the clock pulses from the astable multivibrator are gated by the NOR gate 121. Since the decode counters 124a and 124b are reset by the trigger pulse of the first trigger circuit (114), the counter circuit starts to count the clock pulses at the arrival of the trigger pulses. When it counts up m pulses, the output of the AND gate 124c changes to "1" level so that the NOR gate 122 of the R-S flip-flop is triggered thereby. As a result, the output of the NOR gate 123 changes to "1" level, which closes the NOR gate 121 to stop the counting of the counter circuit. The inverter 120 which inverts the output of the NOR gate 121 produces m clock pulses as shown in FIG. 9(F) for each trigger pulse, that is, each time the output of the air-fuel ratio discriminating circuit 20a is reversed. The number of pulses m is preferably set such that an optimum control is attained during the normal operation.

The second trigger circuit (125-128) produces the trigger pulse as shown in FIG. 9(E) in synchronism with the fall of the output of the NOR gate 122 of the R-S flip-flop, that in, the rise of the output of the NOR gate 123, and applies the trigger pulse to the second clock circuit 20c. The output of the NOR gate 123 is also applied to the second clock circuit 20c.

The second clock circuit 20c comprises the digital-analog converter circuit including the resistors 130, 131, 134, 135 and 140, the capacitors 132, 136 and 139, the transistors 133 and 138 and the diode 137, a voltage-frequency converter circuit including resistors 141 and 143, a capacitor 142 and a voltage-frequency converter, and a frequency divider circuit including a binary counter 145 and a NAND gate 146.

Figure 10:
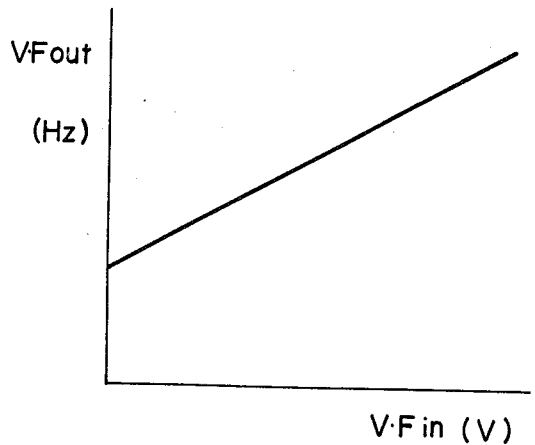
FIG. 10 shows an output characteristic of a V-F converter shown in FIG. 8.

The digital-analog converter circuit receives the on-off signal of the primary winding of the ignition coil of the ignition apparatus 14 as an input signal thereto and converts the applied signal to an analog voltage signal the amplitude of which increases in proportion with the increase of the rotation speed of the engine. The output voltage of the digital-analog converter circuit is applied to the voltage-frequency converter circuit, which produces pulse signal of a frequency which change in accordance with the input voltage, as shown in FIG. 10.

The frequency divider circuit (145, 146) functions to frequency divide the pulse signal, and the factor of the frequency division is switched by the acceleration/deceleration switch 15. For example, during the normal operation, the output $Q_3$ to frequency divide the pulse signal by the factor of 8 is applied to the NAND gate 146 as the clock pulse, and during the acceleration and the deceleration the output $Q_1$ to frequency divide the pulse signal by the factor of 2 is applied as the clock pulse. The timing pulses are in synchronism with the rotation of the engine 1 and the frequency thereof changes switch the rotation speed of the engine.

The reset terminal R of the binary counter 145 is connected to the second trigger circuit (125-128) such that the reset is controlled thereby. The NAND gate 146 is connected to the R-S flip-flop (122, 123) of the first clock circuit 20b to open or close the gate in accordance with the output of the R-S flip-flop.

The second clock circuit 20c produces the clock pulses in accordance with the rotation speed of the engine which is related to the delay time, the acceleration/deceleration state of the engine 1 and the output of the first clock circuit.

The full-close position sensor 12, the command circuit 20d, the reversible shift register 20e, the switching circuit 20f and the pulse motor 11 are of the same construction as in the first embodiment and operate in the same way. Accordingly, the details thereof are not explained here.

Figure 9:
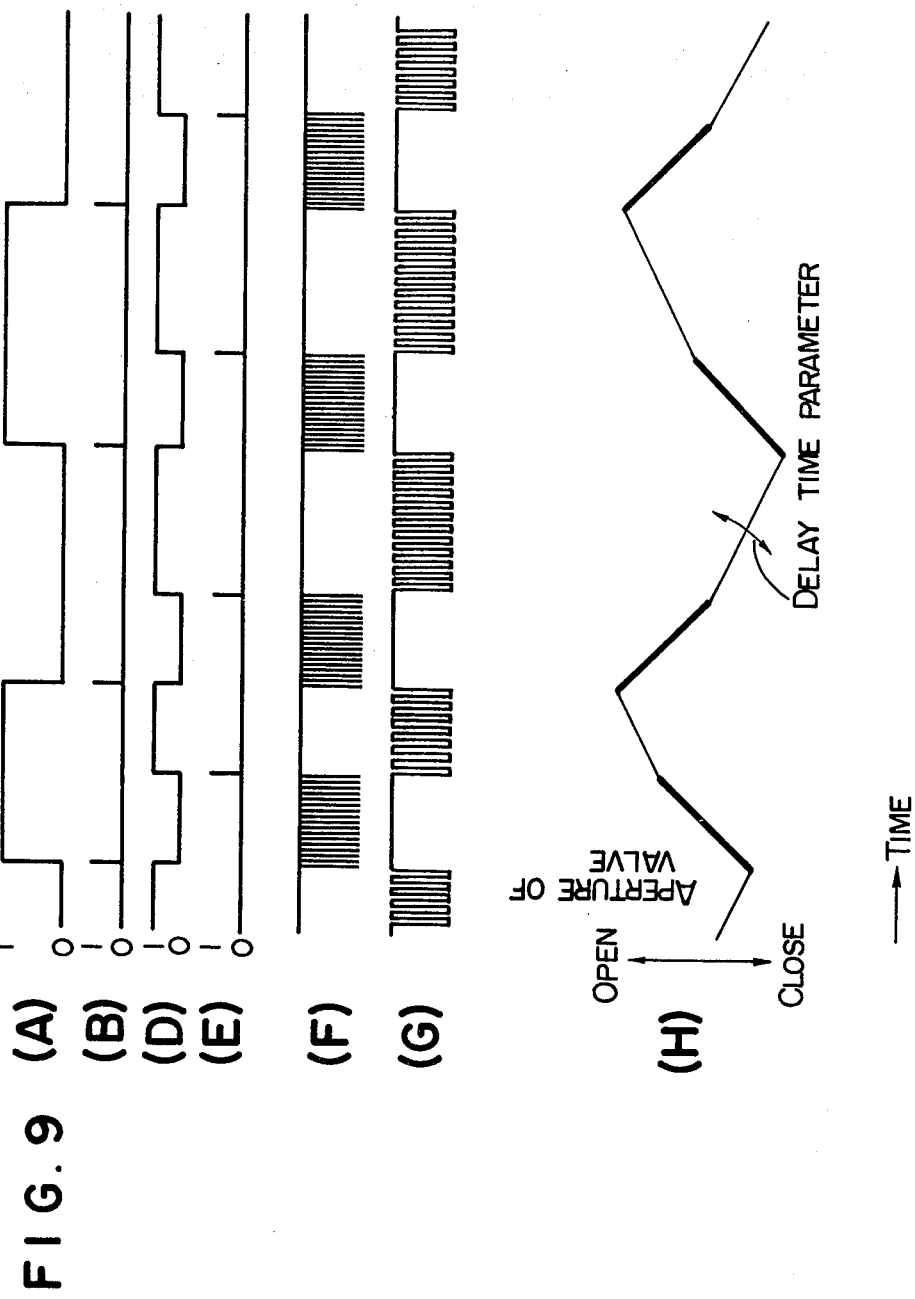
FIG. 9 shows waveforms for explaining the operation of the control unit of FIGS. 7 and 8.

The operation of the second embodiment, particularly that of the pulse motor 11 and the bypass valve 10, is explained with reference to FIG. 9. The air-fuel mixture generated in the carburetor 2 changes due to various factors. The e.m.f. V of the gas sensor 13 changes with the change of the air-fuel mixture, as shown in FIG. 2. The air-fuel ratio discriminating circuit 20a produces "1" or "0" level signal as shown in FIG. 9(A) depending on the level of the e.m.f. V. The first trigger circuit (114) produces a trigger pulse as shown in FIG. 9(B) at the reversal of the output signal of the air-fuel ratio discriminating circuit 20a. In response to the trigger pulse the NOR gate 121 of the R-S flip-flop is opened so that the inverter 120 produces the clock pulses as shown in FIG. 9(F).

The clock pulses are gated by the command circuit 20d in response to the output signal of the air-fuel ratio discriminating circuit 20a and applied to the pulse motor 11 through the reversible shift register 20e and the switching circuit 20f to drive the pulse motor 11.

The clock pulses are of a relatively high frequency as seen from FIG. 9(F) and of the number equal to the number set by the count circuit (124a, 124b and 124c). As a result, the bypass valve 10 is driven fast by a given amount (given aperture) in synchronism with the change of the signal detected by the gas sensor 13 so that the aperture of the bypass valve 10 changes relatively fast as shown by thick solid lines in FIG. 9(H).

When the counter circuit (124a, 124b, 124c) has counted the predetermined number of clock pulses, it triggers the R-S flip-flop (122, 123) to invert the output thereof. As a result, the NOR gate 121 is closed and the NAND gate 146 of the frequency divider circuit is opened and the binary counter 145 is reset by the second trigger circuit. Accordingly, the clock pulses the frequency of which changes with the delay time as shown in FIG. 9(G) are applied from the second clock circuit 20c to the command circuit 20d, and the pulse motor 11 is driven by the clock pulse. In this manner, the aperture of the bypass valve 10 changes as shown by thin solid lines in FIG. 9(H). The control of the drive of the bypass valve 10 by the second clock circuit 20c continues until the output signal of the air-fuel ratio discrimination circuit 20a is next reversed. When the signal detected by the gas sensor 13 changes such that the output signal of the air-fuel ratio discrimination circuit 20a is reversed, the NAND gate 146 is closed by output of the R-S flip-flop and the NOR gate 121 is opened. As a result, the clock pulses from the first clock circuit 20b are again applied to the command circuit 20d.

In this manner, the pulse motor 11 is driven fast by the given amount in synchronism with the change of the output signal of the gas sensor 13, and thereafter the pulse motor 11 is driven at a speed corresponding to the delay time of the system. Accordingly, the overrun of the control, that is, overshoot of the bypass valve 10 during the normal (steady) operation of the engine 1 is prevented and the variation of the air-fuel ratio of the air-fuel mixture is minimized. For example, in the low rotation speed range of the engine 1, the clock pulse frequency of the second clock circuit is reduced so that the drive speed of the bypass valve 10 is reduced to correspond to the delay time of the system. As a result, excessive supply of the supplementary air, which would otherwise be caused by the overshoot, is prevented, the variation of the air-fuel ratio is minimized, and surging of the engine 1 is prevented.

During the transient such as the acceleration and the deceleration of the engine 1, the clock pulse frequency of the second clock circuit is raised to approximately four times as high as the normal frequency by the acceleration/deceleration switch 15 so that the drive speed of the bypass valve 10 is increased to effect the correction of the air-fuel ratio to follow the fast change of the air-fuel ratio.

In this manner, the variation of the air-fuel ratio of the air-fuel mixture is minimized, the catalyst converter 5 cleans the exhaust gas at a high efficiency, and the drivability of the car is enhanced.

Figure 11:
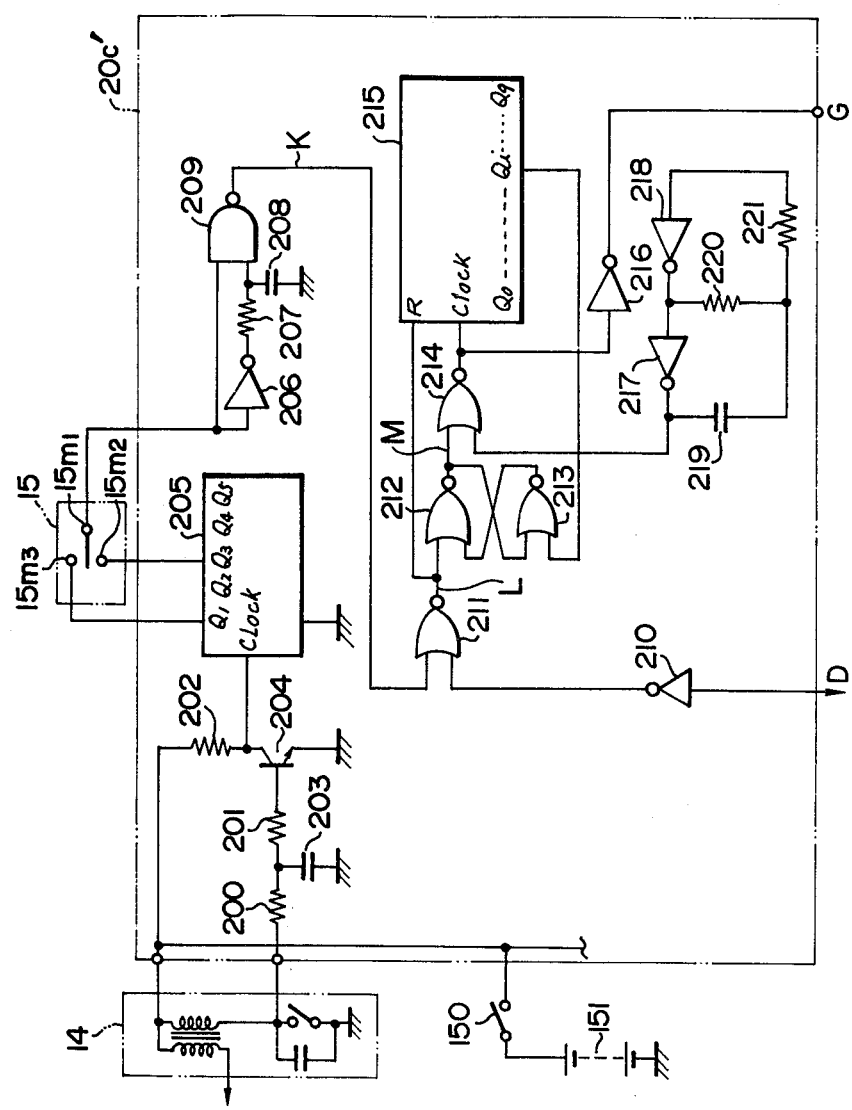
FIG. 11 is an electrical circuit diagram of major portions of a third embodiment of the control unit of the present invention, which is a modification of FIG. 8.

While the second embodiment is shown to continuously drive the bypass valve 10 by the clock pulses of the second clock circuit, the bypass valve 10 may be driven intermittently. One example thereof, that is, a third embodiment of the present invention is shown in FIG. 11. In FIG. 11, a second clock pulse circuit 20c' comprises a shaping circuit including resistors 200, 201 and 202, a capacitor 203 and a transistor 204, for shaping the on-off signal of the rotation detector 14, and a binary counter 205 which receives the output of the shaping circuit as the clock signal and frequency divides it. The factor of the frequency division is switched by the acceleration/deceleration switch 15 such that the pulse signal which is frequency divided by the factor of 8 is produced during the normal state while the pulse signal which is frequency divided by the factor of 2 is produced during the acceleration and the deceleration.

The monostable multivibrator comprises an inverter 206, a resistor 207, a capacitor 208 and a NAND gate 209, and it stretches the pulse signal of the binary counter 205 to produce the timing pulse.

The pulse generator circuit is an astable multivibrator comprising inverters 217 and 218, a capacitor 219 and resistors 220 and 221, and it produces clock pulses of a given frequency to drive the pulse motor 11.

The gate circuit comprises an inverter 210 connected to the terminal D of the R-S flip-flop of the first clock circuit 20b, a NOR gate 211, NOR gates 212 and 213 forming an R-S flip-flop, a NOR gate 214 for gating the clock pulses, an inverter 216 and a binary counter 215 for counting the clock pulses, and it produces clock pulses of a given frequency at a terminal G in response to the gate signal applied to the NOR gate 211.

Figure 12:
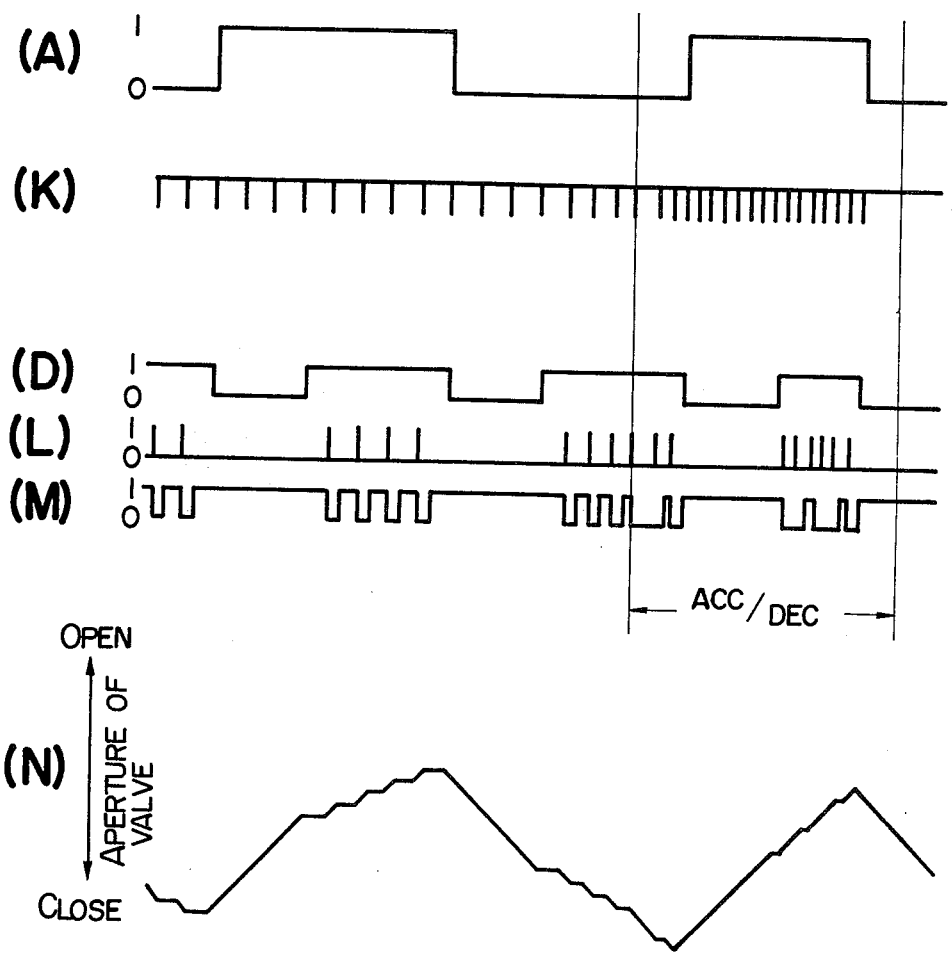
FIG. 12 shows waveforms for explaining the operation of the control unit of FIG. 11.

The timing pulses from the output of the monostable multivibrator (206–209) are in synchronism with the rotation of the engine during the normal operation thereof as shown in FIG. 12(K) and the period of the timing pulses is reduced to approximately one fourth of the normal period during the acceleration and the deceleration. The timing pulses from the multivibrator (206–209) are gated by the NOR gate 211 in response to the output signal of the R-S flip-flop of the first clock circuit 20b shown in FIG. 12(D). The NOR gate 211 thus produces the output as shown in FIG. 12(L). Each time the trigger pulse shown in FIG. 12(L) is generated, the R-S flip-flop (212, 213) is inverted and the binary counter 215 starts to count the clock pulses. When i clock pulses have been counted by the binary counter 215, the output $Q_i$ of the binary counter 215 assumes the "1" level, which causes the R-S flip-flop to be inverted to close the NOR gate 214.

In this manner, the output of the NOR gate 212 of the R-S flip-flop changes in the manner shown in FIG. 12(M). When this output is at "0" level, the clock pulses of the pulse generator circuit are gated and the bypass valve 10 is driven intermittently after it has been driven by the given amount, as shown in FIG. 12(N). The ratio of the drive period is determined by the rotation speed of the engine and the acceleration and deceleration state of the engine such that the overall drive speed of the bypass valve 10 changes in accordance with the delay time.

Figure 13:
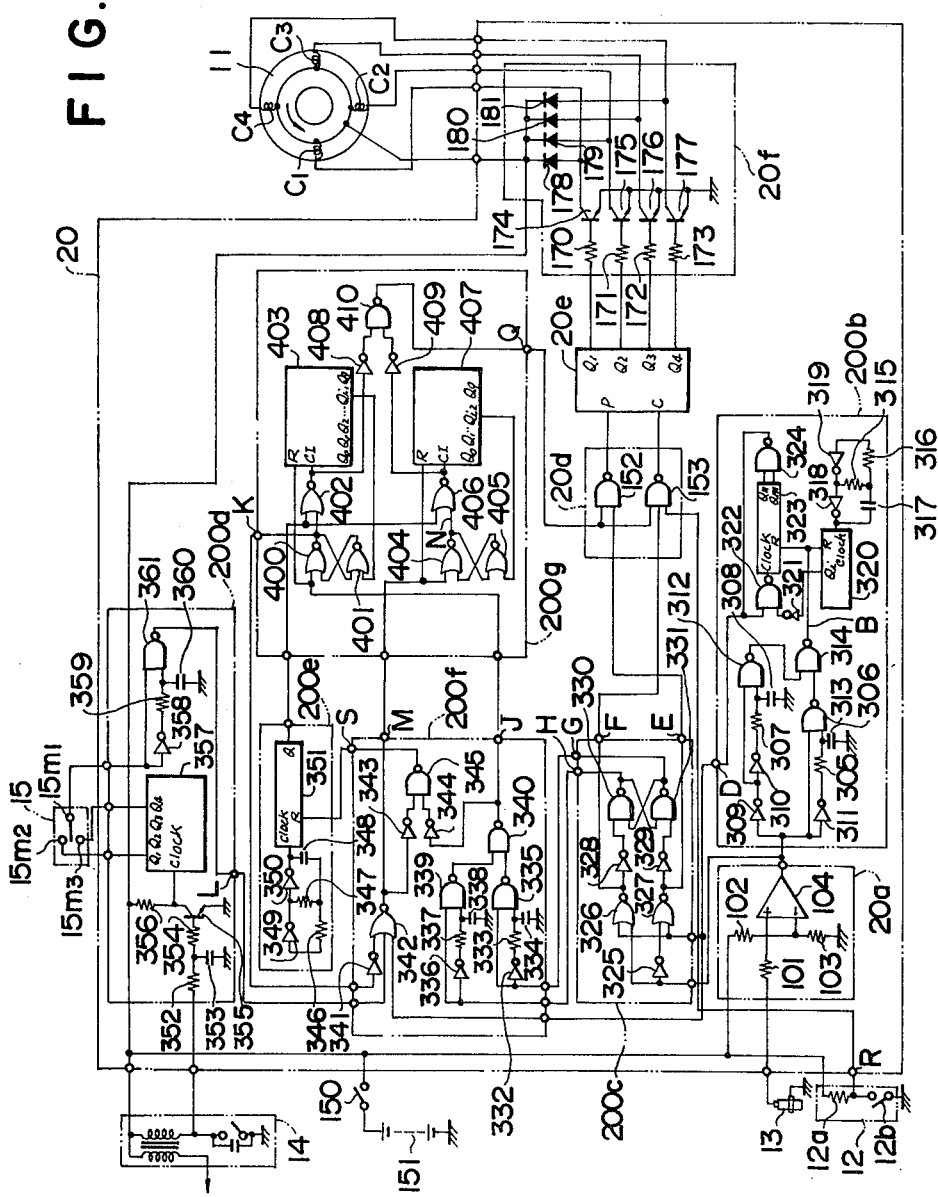
FIG. 13 is an electrical circuit diagram illustrating a fourth embodiment of the control unit of the present invention.

Referring to FIGS. 13 and 14, a fourth embodiment of the present invention is explained. In the present embodiment, like in the third embodiment, the bypass valve 10 is driven at the first drive speed for the given time period after the reversal of the output of the air-fuel ratio discriminating circuit 20a, and thereafter the bypass valve 10 is driven intermittently at the second drive speed until the next reversal of the output of the air-fuel ratio discriminating circuit 20a. The present embodiment further includes a function of stopping the drive of the bypass valve for a given time period when the output of the air-fuel ratio discriminating circuit 20a is reversed.

The detail of the present embodiment is explained with reference to the drawings. In FIG. 13, the air-fuel ratio discriminating circuit 20a has the similar construction to that of the previous embodiment, and the operational amplifier 104 produces the "1" level signal when the air-fuel ratio detected by the gas sensor 13 is lower than the desired air-fuel ratio, that is, when the air-fuel mixture is richer, and produces the "0" level signal when the detected air-fuel ratio is higher than the desired air-fuel ratio, that is, when the air-fuel mixture is leaner.

A filter circuit 200b comprises a first trigger circuit including two monostable multivibrators having resistors 305, 307, capacitors 306, 308, inverters 310, 311 and NAND gates 312, 313, respectively, an inverter 309 and a NAND gate 314, an astable multivibrator having resistors 315 and 316, a capacitor 317 and inverters 318 and 319, and a timer circuit including binary counters 320 and 323, an inverter 321 and NAND gates 322 and 324.

The first trigger circuit (305-314) produces a trigger pulse at the terminal B as shown in FIG. 14(B) in synchronism with the reversal of the output signal of the operational amplifier 104 of the air-fuel ratio discriminating circuit 20a (See FIG. 14(A)), that is, the rise and fall thereof, and the trigger pulse is used as a reset signal to repetitively operate the timer circuit (320, 323) so that the "1" level signal is produced at the terminal D for the given time period after the application of the trigger pulse, as shown in FIG. 14(D).

A flip-flop circuit 200c comprises inverters 325, 328 and 329, NOR gates 326 and 327, and NAND gates 330 and 331 forming an R-S flip-flop, and it receives the outputs of the air-fuel ratio discriminating circuit 20a and the filter circuit 200b as the input signals thereto. It gates the input signals to produce drive direction signals for the pulse motor 11 at terminals E and F shown in FIGS. 14(E) and (F). The drive direction signal shown in FIG. 14(E) is produced by delaying the rise of the air-fuel ratio signal shown in FIG. 14(A) by the amount corresponding to the filter signal shown in FIG. 14(D), and it is held at the "0" level if the time period during which the air-fuel ratio signal is at the "1" level after the rise thereof is shorter than the time period during which the filter signal is at the "1" level. The drive direction signal shown in FIG. 14(F) is derived by delaying the fall of the air-fuel ratio signal shown in FIG. 14(A) by the amount corresponding to the filter signal and inverting the delayed signal, and it is held at the "0" level if the time period during which the air-fuel ratio signal is at the "0" level after the fall thereof is shorter than the time period during which the filter signal is at the "1" level. The R-S flip-flop (330 and 331) is triggered at the rise of the drive direction signals from the NOR gates 326 and 327 to produce synchronizing signals at terminals G and H as shown in FIGS. 14(G) and (H).

A timing pulse circuit 200d comprises a shaping circuit including resistors 352, 354 and 356, a capacitor 353 and a transistor 355, a binary counter 357, and a monostable multivibrator including an inverter 358, a resistor 359, a capacitor 360 and a NAND gate 361, and it receives the on-off signal of the primary winding of the ignition coil of the ignition apparatus which forms the rotation detector 14, as an input signal thereto. The timing pulse circuit 200d shapes the on-off signal by the shaping circuit (352-356) and frequency divides it as the clock signal of the binary counter 357. The divided output is applied to the monostable multivibrator (358-361) which stretches the pulse to produce the timing pulses as shown in FIG. 14(L). The frequency divided outputs are switched by the acceleration/deceleration switch 15 such that a 1/16 frequency divided output $Q_4$ is applied to the monostable multivibrator (358-361) during the normal (steady) operation while a ½ frequency divided output $Q_1$ is applied during the transient such as the acceleration and the deceleration.

An oscillator circuit 200e comprises an astable multivibrator including resistors 346 and 347, a capacitor 348 and inverters 349 and 350, and a binary counter 351, and it produces clock pulses of a fixed frequency from the astable multivibrator. The binary counter 351 frequency-divides the clock pulses.

A reset pulse generating circuit 200f comprises a second trigger circuit including two monostable multivibrators having inverters 332 and 336, resistors 333 and 337, capacitors 334 and 338 and NAND gates 335 and 339, respectively, and a NAND gate 340, a third trigger circuit including an inverter 341 and a NOR gate 342, and a fourth trigger circuit including inverters 343 and 344 and a NAND gate 345, and the reset pulse generating circuit 200f receives the outputs of the filter circuit 200b, the flip-flop circuit 200c, the timing pulse circuit 200d and a clock pulse circuit 200g, as input signals thereto. The second trigger circuit (340) produces the trigger pulse shown in FIG. 14(J) in synchronism with the rise of the outputs of the flip-flop circuit 200c shown in FIGS. 14(G) and (H), and delivers the trigger pulse from the NAND gate 340. The third trigger circuit (341 and 342) gates the timing pulses of the timing pulse circuit 200d in response to the signals of the filter circuit 200b and the clock pulse circuit 200g to be described later such that the NOR gate 342 is opened when the output of the filter circuit 200b shown in FIG. 14(D) is at the "0" level and the output of the NOR gate 401 of the clock pulse circuit 200g is at the "0" level (and hence the output of the NOR gate 400 is at the "1" level), to gate the timing pulses of the timing circuit 200d as shown in FIG. 14(M). The fourth trigger circuit (343–345) gates the outputs of the second and third trigger circuits (340, 347) to produce a trigger pulse which is the superposition of FIGS. 14(J) and (M).

The clock pulse circuit 200g comprises a first counter circuit including an R-S flip-flop having NOR gates 400 and 401, a NOR gate 402 and a decode counter 403, a second counter circuit including an R-S flip-flop having NOR gates 404 and 405, a NOR gate 406 and a decode counter 407, and a gate circuit including inverters 408 and 409 and a NAND gate 410, and the clock pulse circuit 200g receives the outputs of the oscillator circuit 200e and the reset pulse circuit 200f as the input signal thereto. The decode counter 403 is reset by the "1" level signal of the NAND gate 340 of the reset pulse circuit 200f, applied to the reset terminal R such that all of the outputs of the decode counter 403 are reset to "0" level. The decode counter 403 counts up when the pulse applied to the carry-in terminal CI changes from the "0" level to "1" level, and the "1" level signal is produced sequentially at the output terminals $Q_0$, $Q_1$, ... $Q_9$.

The R-S flip-flop comprising the NOR gates 400 and 401 is triggered by the trigger pulse of the second trigger circuit (332–340) of the reset pulse circuit 200f so that the output of the NOR gate 400 assumes the "0" level, which causes the NOR gate 402 to be opened to gate the clock pulses of oscillator circuit 200e. Since the decade counter 403 is reset by the trigger pulse of the second trigger circuit (332–340), the first counter circuit (400–403) starts to count the clock pulses at the arrival of the trigger pulse from the second trigger circuit (340), and when it counts $i_1$ pulses, the output $Q_{il}$ changes to the "1" level, which triggers the NOR gate 401 of the R-S flip-flop. As a result, the output of the NOR gate 400 changes to the "1" level as shown in FIG. 14(K), which causes the NOR gate 402 to the closed and the decade counter 403 stops to count. Thus, the NOR gate 402 produces $i_1$ clock pulses each time it receives the trigger pulse.

After the first counter circuit (400–403) has counted $i_1$ pulses, the "1" level signal of the NOR gate 400 of the first counter circuit is inverted by the inverter 341 of the reset pulse circuit 200f and the resulting "0" level signal is applied to the NOR gate 342. At this time, if the output of the filter circuit 200b is at "0" level, the NOR gate 342 is opened so that the timing pulses of the timing pulse circuit 200d of the third trigger circuit (341, 342) are gated to the second counter circuit (404–407). The second counter circuit (404–407) is opened by the timing pulses shown in FIG. 14(M) in a similar manner to the first counter circuit (400–403) and the output of the NOR gate 404 assumes "0" level each time the timing pulse occurs, as shown in FIG. 14(N), to open the NOR gate 406, which gates $i_2$ clock pulses. The outputs of the NOR gates 402 and 406 are applied through the inverters 408 and 409, respectively, to the NAND gate 410 and gated thereby to the command circuit 20d. Accordingly, the clock pulse circuit 200g first produces $i_1$ clock pulses as shown in FIG. 14(Q) and thereafter produces $i_2$ clock pulses intermittently at a period determined by the rotation speed of the engine 1 corresponding to the delay time of the system and the acceleration and deceleration state of the engine 1.

The full-close position sensor 12 comprises the resistor 12a and the contact 12b, which is closed when the bypass valve 10 is fully closed, to produce "0" level signal at the output terminal R.

The command circuit 20d comprises the NAND gates 152 and 153 and gates the clock pulses of the clock pulse circuit 200g in response to the drive direction signal of the flip-flop circuit 200c and the full-close signal of the full-close position sensor 12.

The reversible shift register 20e, the switching circuit 20f and the pulse motor 11 are of the same construction as those in the provious embodiment and operate in the same manner.

The operation of the fourth embodiment is now explained. As stated above, the air-fuel ratio of the air-fuel mixture generated by the carburetor 2 changes by various factors. The e.m.f. V of the gas sensor 13 changes with the change of the air-fuel ratio as shown in FIG. 2. Accordingly, the air-fuel ratio discriminating circuit 20a produces "1" and "0" level signal depending on the e.m.f. as shown in FIG. 14(A). Upon reversal of the output signal of the air-fuel ratio discriminating circuit 20a, the first trigger circuit (305–314) of the filter circuit 200b produces a trigger pulse as shown in FIG. 14(B) and the time circuit (320–324) produces a stop signal shown in FIG. 14(D). When the stop signal is at "1" level, either the NOR gate 326 or 327 of the flip-flop circuit 200c produce "0" level outputs to close either the NAND gate 152 or 153 of the command circuit 20d. As a result, the pulse motor 11 and hence the bypass valve 10 are temporarily stopped.

When the stop signal changes to "0" level, the second trigger circuit (332–340) of the reset pulse circuit 200f produces a trigger pulse shown in FIG. 14(J). In response to the trigger pulse (J), the clock pulse circuit 200g produces $i_1$ clock pulses as shown in FIG. 14(Q) and then produces $i_2$ clock pulses intermittently at a timing corresponding to the delay time of the system.

Those clock pulses are gated by the command circuit 20d in response to the drive direction signal of the air-fuel ratio discriminating circuit 20a, and the gated pulses are applied to the pulse motor 11 through the reversible shift register 20e and the switching circuit 20f to drive the pulse motor 11. The pulse motor 11 is thus driven at the first speed by the $i_1$ clock pulses and then driven at the second speed as a whole by the $i_2$ intermittent pulses.

In this manner, it is determined whether the air-fuel mixture is richer or leaner than the desired mixture, and when the air-fuel mixture is richer the pulse motor 11 is stopped for the given time period and then it is driven in the direction to open the bypass valve 10 mounted in the supplementary air path 9, and when the air-fuel mixture is leaner the pulse motor 11 is stopped for the given time period and the it is driven in the direction to close the bypass valve so that the amount of the supplementary air is controlled to attain the desired air-fuel ratio.

In order to prevent the "overrun" condition of the bypass valve 10 in which the air-fuel mixture does not reach the desired air-fuel ratio even when the bypass valve 10 has reached the full-close position and the air-fuel ratio discriminating circuit 20a causes the bypass valve 10 to be further driven, the NAND gate 153 is closed when the full-close position sensor 12 detects the full-close position of the bypass valve 10, to stop the supply of the pulse signals to the reversible shift register 20e to prevent the pulse motor 11 from driving the bypass valve 10 in the closing direction.

According to the present invention, even of a spike pulse is introduced to the air-fuel ratio discriminating circuit 20a by the disturbance in the exhaust gas flow at the gas sensor 13 or even if the air-fuel ratio of the air-fuel mixture is near the reference air-fuel ratio (desired air-fuel ratio) as shown by a region T and hence the output of the air-fuel ratio discriminating circuit 20a is reversed at a short period, the pulse motor 11 is not drive unless the output of the air-fuel discriminating circuit 20a is held at the same level for a time period longer than the time period of the "1" level stop signal established by the timer circuit of the filter circuit 200b, and hence the bypass valve 10 is kept stopped. Thus, the erroneous operation of the bypass valve 10 and the reversal thereof in a short period are prevented, and the air-fuel ratio of the air-fuel mixture is controlled in a stable manner.

When the air-fuel ratio of the air-fuel mixture deviates from the desired air-fuel ratio, the pulse motor 11 is driven in the manner described above to control the aperture of the bypass valve 10 so that the air-fuel ratio is adjusted to the desired air-fuel ratio in an exact and stable manner.

As shown in FIG. 14(V), the bypass valve 10 is temporarily stopped for the given time period in synchronism with the change in the output signal of the gas sensor 13 and then the bypass valve 10 is driven by the given amount. Thereafter, the bypass valve 10 is driven at the second speed as a whole by the timing pulses corresponding to the delay time of the system. Accordingly, the overrun of the control, that is, overshoot of the bypass valve during the normal (steady) operation of the engine 1 is prevented and the variation of the air-fuel ratio of the air-fuel mixture is minimized. For example, in a low rotation speed range of the engine 1, the period (interval) of the timing pulses of the timing circuit 200d which are in synchronism with the rotation of the engine is lengthened so that the drive speed of the bypass valve 10 is reduced to correspond to the delay time of the system. In this manner, the overshoot of the control is prevented, the excessive supply of the supplementary air, which would otherwise be caused by the overshoot or erroneous operation of the bypass valve, is prevented, the variation of the air-fuel ratio is minimized, and the surging of the engine 1 is prevented.

In a high rotation speed range of the engine 1, the bypass valve 10 is driven fast at the first speed by the given amount and then it is driven at the second speed which is lower than the first speed. Accordingly, the control cycle for the air-fuel ratio is shortened so that the correction of the air-fuel ratio is effected to fully follow the fast change of the air-fuel ratio.

During the transient of the engine 1 such as the acceleration or deceleration, the frequency of the clock pulses of the second clock circuit is raised to approximately four times as high as the normal frequency by the acceleration/deceleration switch 15 and hence the drive speed of the bypass valve 10 is increased accordingly. As a result, the correction of the air-fuel ratio can be effected to fully follow the change during the acceleration and deceleration.

In this manner, the variation of the air-fuel ratio of the air-fuel mixture is minimized, the catalyst converter 5 cleans the exhaust gas at a high efficiency and the drivability of the car is enhanced.

While the above embodiment is directed to the control of the air-fuel ratio in the suction system, it should be understood that the teaching of the present invention may be applied to the control of secondary air to the exhaust system.

Further, while the above embodiment uses the rotation detector 14 and the acceleration/deceleration switch 15, sensors for the amount of intake air to the engine 1, the aperture of the throttle or the speed of the car may be used.

What is claimed is:

1. In an additional air supply system for an internal combustion engine of the type including a combustion chamber for producing a power therein, an intake system operatively communicating with said combustion chamber for supplying thereto an air-fuel mixture, an exhaust system operatively communicating with said combustion chamber for conveying an exhaust gas from said combustion chamber to the atmosphere, an additional air supply pipe communicating with at least one of said intake and exhaust systems for supplying additional air thereto, to thereby control an air-fuel ratio of said air-fuel mixture at a desired value, air-fuel ratio detecting means disposed in said exhaust system for detecting the air-fuel ratio of the air-fuel mixture supplied with said additional air, control means operatively disposed in said additional air supply pipe for controlling the amount of the additional air to be supplied, drive means operatively connected with said control means for driving the same, and a control circuit electrically connected with said air-fuel ratio detecting means and said drive means for actuating said drive means in response to the detected air-fuel ratio, the improvement wherein said control circuit comprises:

an air-fuel ratio discriminating circuit connected with said air-fuel ratio detecting means for comparing the output from said detecting means with a preset level and for generating a high level or a low level signal based on the comparison; and actuating means, connected with said discriminating circuit, for actuating said drive means at a first speed for a first period starting from a time when the signal from said discriminating circuit is changed from one level to the other level, said actuating means also actuating said drive means at a second speed for a second period starting from a time when said first period terminates and terminating at a time when the signal from said discriminating circuit is again changed from said other level to said one level.

2. An improved control circuit according to claim 1, wherein said first speed is faster than said second speed.

3. An improved control circuit according to claim 1, wherein said first period is changeable in response to a running speed of said engine.

4. An improved control circuit according to claim 1, wherein said first period is changeable in response to a rapid acceleration and deceleration of said engine.

5. An improved control circuit according to claim 1, wherein, said second speed is changeable in response to a running speed of said engine.

6. An improved control circuit according to claim 1, wherein said second speed is changeable in response to a rapid acceleration and deceleration of said engine.

7. An improved control circuit according to claim 1, wherein the actuation of said drive means during said second period is carried out intermittently.

8. An improved control circuit according to claim 7, wherein the intermittent actuation of said drive means responds to a running speed of said engine.

9. An improved control circuit according to claim 1, further comprises:

means for stopping the actuating of said drive means for a third period shorter than said first period, said third period starting from a time when the signal from said discriminating circuit is changed from one level to the other level.

10. An improved control circuit according to claim 9, wherein the actuation of said drive means during said second period is carried out intermittently.

11. An improved control circuit according to claim 10, wherein the intermittent actuation of said drive means responds to a running speed of said engine.

12. An improved control circuit according to claim 10, wherein, the intermittent actuation of said drive means responds to a rapid acceleration and deceleration of said engine.

13. An additional air supply control apparatus for controlling the amount of additional air supplied through a bypass pipe communicating with at least one of intake and exhaust systems in an internal combustion engine to thereby control the air-fuel ratio of an air-fuel mixture at a desired value comprising:

air-fuel ratio detecting means disposed in the exhaust system for detecting the air-fuel ratio of the air-fuel mixture supplied with the additional air;

rotation detecting means for detecting a rotational speed of the engine;

control means operatively disposed in the bypass pipe for controlling the amount of the additional air to be supplied;

drive means operatively connected with said control means for driving the same; and control circuit means electrically connected with said air-fuel ratio detecting means, said rotation detecting means and said drive means for actuating said drive means in response to the detected air-fuel ratio and rotational speed, said control circuit means includes:

an air-fuel ratio discriminating circuit connected with said air-fuel ratio detecting means for comparing the output from said detecting means with a preset level and for generating a high level or a low level signal based on the comparison;

a pulse generator circuit connected with said air-fuel ratio discriminating circuit for generating a trigger pulse in response to the occurrence of said high level and low level signals and for generating first and second pulse signals;

said first and second pulse signals being actuatable to said drive means respectively at first and second speeds; and a clock circuit connected with said rotation detecting means, said pulse generator circuit and said drive means, said clock circuit being adapted to count said first pulse signal in response to said trigger pulse and to permit the passage of said first pulse signal to said drive means during a first period starting from a time when the signal from said air-fuel ratio discriminating circuit is changed from one level to the other level until the counting of said first pulse signal reaches a predetermined value corresponding to a rotational speed detected by said rotation detecting means, and said clock circuit being also adapted to permit the passage of said second pulse signal to said drive means during the rest period starting from the termination of said first period until the signal from said air-fuel ratio discrimination circuit is changed from the other level to said one level.

* * * * *